(12) United States Patent
Katada (10) Patent No.: US 10,270,326 B2
(45) Date of Patent: Apr. 23, 2019

(54) LINEAR VIBRATION MOTOR

(71) Applicant: Nidec Copal Corporation, Tokyo (JP)

(72) Inventor: Yoshinori Katada, Tokyo (JP)

(73) Assignee: NIDEC COPAL CORPORATION, Tokyo (JP)

( * ) Notice: Subject to any disclaimer, the term of this patent is extended or adjusted under 35 U.S.C. 154(b) by 292 days.

(21) Appl. No.: 15/500,280

(22) PCT Filed: Jul. 27, 2015

(86) PCT No.: PCT/JP2015/081254
§ 371 (c)(1),
(2) Date: Jan. 30, 2017

(87) PCT Pub. No.: WO2016/017584
PCT Pub. Date: Feb. 4, 2016

(65) Prior Publication Data
US 2017/0214307 A1    Jul. 27, 2017

(30) Foreign Application Priority Data

Jul. 28, 2014 (JP) ................................. 2014-153354

(51) Int. Cl.
H02K 33/00 (2006.01)
H02K 33/16 (2006.01)
B06B 1/04 (2006.01)

(52) U.S. Cl.
CPC ............ *H02K 33/16* (2013.01); *B06B 1/045* (2013.01)

(58) Field of Classification Search
CPC ................................ H02K 33/16; B06B 1/045
(Continued)

(56) References Cited

U.S. PATENT DOCUMENTS

| 5,434,549 A | 7/1995 | Hirabayashi et al. |
| 2011/0101796 A1 | 5/2011 | Odajima et al. |

(Continued)

FOREIGN PATENT DOCUMENTS

| CN | 102055299 A | 5/2011 |
| CN | 102971947 A | 3/2013 |

(Continued)

OTHER PUBLICATIONS

International Search Report (English and Japanese) and PCT Written Opinion (Japanese) dated Oct. 13, 2015 issued in corresponding PCT International Application No. PCT/JP2015/071254.

*Primary Examiner* — Thanh Lam
(74) *Attorney, Agent, or Firm* — Troutman Sanders LLP (57) ABSTRACT

The present invention is capable of increasing the thinness of a linear vibration motor equipped with a fixed shaft. The linear vibration motor is equipped with: a frame; one fixed shaft extending in one axial direction and affixed to the frame; a drive unit for driving a magnet in the one axial direction, and equipped with a coil affixed to the frame and the magnet, which is positioned so as to be parallel to the fixed shaft; a needle which is slidably supported in the one direction by the fixed shaft, and is equipped with the magnet and a spindle part connected to the magnet; and an elastic member for imparting an elastic force to the needle in opposition to the driving force of the drive unit, and positioned so as not to be coaxial with the fixed shaft.

12 Claims, 8 Drawing Sheets

(58) Field of Classification Search
USPC .................................................... 310/25, 15
See application file for complete search history.

(56) References Cited

U.S. PATENT DOCUMENTS

| | | |
|---|---|---|
| 2013/0169071 A1 | 7/2013 | Endo et al. |
| 2014/0265650 A1* | 9/2014 | Jeon ............... H02K 33/16 310/25 |
| 2015/0137627 A1* | 5/2015 | Katada ............ H02K 33/16 310/25 |
| 2015/0137628 A1* | 5/2015 | Endo ............... H02K 33/16 310/25 |
| 2017/0354992 A1* | 12/2017 | Katada ............ H02K 33/16 |

FOREIGN PATENT DOCUMENTS

| | | |
|---|---|---|
| EP | 580117 A2 | 1/1994 |
| JP | S54121206 U | 8/1979 |
| JP | H079081 U | 2/1995 |
| JP | 2011097747 A | 5/2011 |
| JP | 2011205870 A | 10/2011 |
| JP | 2012016153 A | 1/2012 |
| KR | 20130111515 A | 10/2013 |
| TW | 201121210 A | 6/2011 |
| TW | 201223083 A | 6/2012 |
| WO | 2012/002329 A1 | 1/2012 |

\* cited by examiner

Cross-section A1-A1

FIG. 2(c)

Cross-section A2-A2

FIG. 3(a)

Cross-section B-B

LINEAR VIBRATION MOTOR

CROSS-REFERENCE TO RELATED APPLICATIONS

This is a U.S. national phase application under 35 U.S.C. § 371 of International Patent Application No. PCT/JP2015/071254, filed Jul. 27, 2015, and claims benefit of priority to Japanese Patent Application No. 2014-153354, filed Jul. 28, 2014. The entire contents of these applications are hereby incorporated by reference.

FIELD OF TECHNOLOGY

The present invention relates to a linear vibration motor for generating a vibration through causing a needle to undergo reciprocating vibration linearly through a signal input.

BACKGROUND

A vibration motor (or a vibration actuator) is that which communicates, to a user of a communication device or to an operator who is holding any of a variety of electronic devices, the state of an input signal through a vibration, through generating a vibration through an incoming call on a communication device or through the transmission of an alarm on any of a variety of electronic devices, and is built into any of a variety of electronic devices, such as mobile information terminals, including mobile telephones.

Among the various types of vibration motors under development, there is a known linear vibration motor that is able to generate relatively large vibrations through linearly reciprocating vibrations. This linear vibration motor employs a structure that is provided with a straight stationary shaft, and a needle is vibrated therealong, making it possible to achieve stabilized vibration with little noise produced by components striking each other, and making it possible to achieve resistance to damage, such as when there is a drop impact, through the needle being held by the stationary shaft.

In the prior art for linear vibration motors that are equipped with stationary shafts there have been proposals for those wherein a driving portion is structured from a coil that is secured to a case and a magnet that is disposed within the coil, a needle is structured through connecting a weight portion to the magnet along the direction of vibration, a through hole is formed in the needle along the direction of vibration, and a single stationary shaft is passed through this through hole (See, for example, Japanese Unexamined Patent Application Publication No. 2012-16153), or two stationary shafts are provided along the direction of vibration, a driving portion made from a coil and a magnet is disposed between the two stationary shafts, and a needle that is provided with a weight portion and which is driven by the driving portion is supported by the two stationary shafts so as to be able to slide (See, for example, Japanese Unexamined Patent Application Publication No. 2011-97747), and the like. In each of these prior art technologies, coil springs are provided around the stationary shaft, and the needle is caused to undergo reciprocating vibration along the stationary shaft through the driving force by the driving portion in one direction and the elastic force of the coil spring in opposition to the driving force.

SUMMARY

With smaller and thinner mobile electronic devices there is the need for smaller and thinner vibration motors to be equipped therein. In particular, in electronic devices such as smart phones that are equipped with flat panel displaying portions, space within the devices is limited in the direction of thickness, perpendicular to the plane of the display, so there is a strong need for thinner vibration motors to be equipped therein.

When one considers reducing the thickness of a linear vibration motor that is provided with a stationary shaft, in the first of the prior art technologies described above, a through hole is formed along the direction of vibration in a needle wherein a weight portion is connected to a magnet along the direction of vibration, and thus a through hole is formed in the magnet itself, requiring the magnet to be adequately thick, in respect to the diameter of the stationary shaft, in order to secure an adequate volume for the magnet, to thereby produce the desired driving force. Moreover, the driving portion is structured through the provision also of a coil around the magnet, and thus there is a problem in that this is not completely compatible with reducing thickness. Moreover, while one may consider forming the through hole in the magnet itself through dividing into magnets on the left and the right of the stationary shaft, this would increase the number of components for the magnet, not only preventing good manufacturability, but also producing a problem in that it would be difficult to secure the magnet volume for producing an adequate driving force.

In contrast, if two stationary shafts are provided and a driving portion is provided therebetween, as in the latter of the prior art technologies described above, it would not be necessary to form a through hole through the magnet, thus enabling the magnet to be made thinner. However, because two stationary shafts would be provided, there would be the need for high accuracy in aligning the shafts, so there would be a problem in that the manufacturing process would be complex, and if the accuracy of the alignment of the shafts were lacking, it would not be possible to produce stabilized vibration, because components would rattle or strike the interior of the guide hole through which the stationary shaft passes.

Moreover, because in both of the prior art technologies set forth above coil springs are provided around the stationary shafts, of necessity the diameters of the coil springs must be larger than the diameters of the stationary shafts. Because the diameters of the stationary shafts must, to some degree, be large to facilitate processing of components and in order to produce a stabilized vibration, there is a problem in that the provision of coil springs with diameters even larger than those would cause a reduction in thickness difficult.

In the present invention, the handling of such problems is an example of the problem to be solved. That is, the object of the present invention is to enable a linear vibration motor that is provided with a shaft to be made thinner, and, furthermore, to enable the reduction in thickness while not increasing the number of components for the magnet, suppressing a reduction in the volume of the magnet, and ensuring a stabilized vibration.

In order to achieve such an object, the linear vibration motor of the present invention is equipped with the following structures:

A linear vibration motor comprising: a frame; a shaft provided protruding along an axial direction within the frame; a driving portion, comprising a magnet and a coil, which is secured to the frame, for driving the magnet along the axial direction; a needle, comprising the magnet and a weight portion that is connected to the magnet, supported by the shaft so as to be able to slide in the axial direction; and an elastic member for applying, to the needle, an elastic force that opposes the driving force of the driving portion, arranged off-axis from the shaft within the frame.

DETAILED DESCRIPTION

Figure 1:
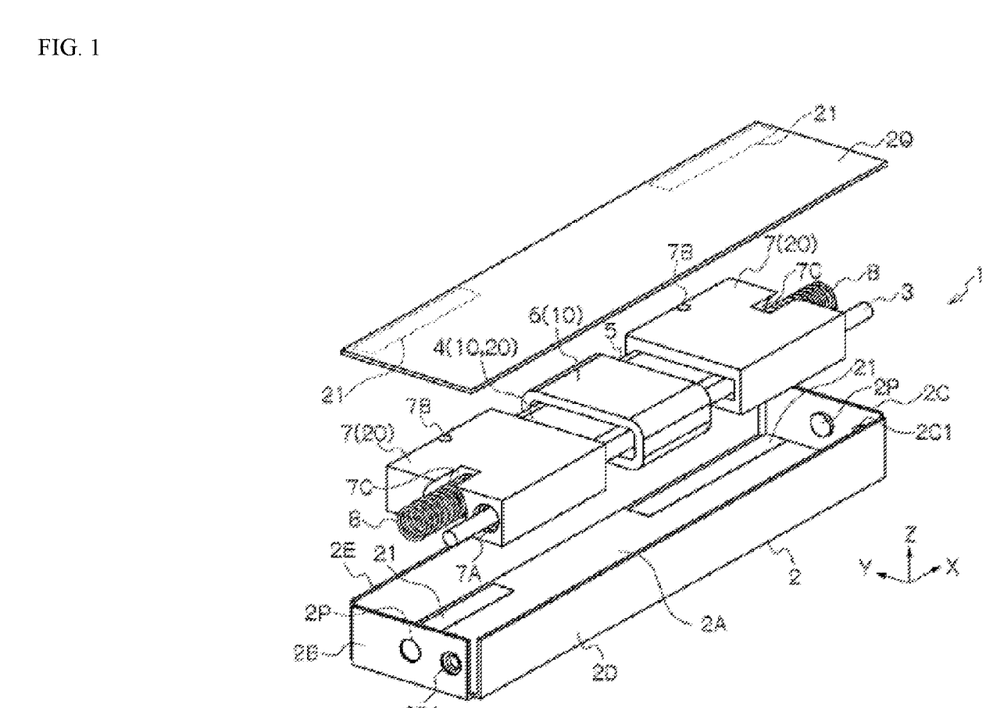
FIG. 1 is an assembly perspective diagram illustrating the overall structure of a linear vibration motor according to an example according to the present invention.
Figure 2A:
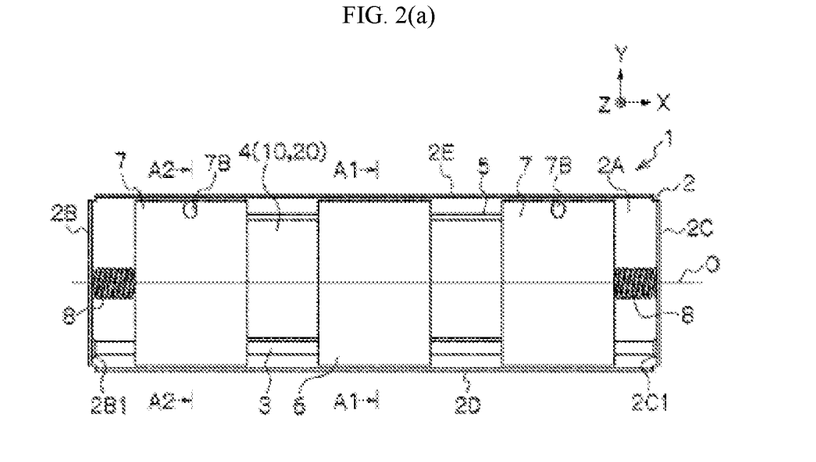
FIG. 2(a), FIG. 2(b) and FIG. 2(c) are explanatory diagrams illustrating the overall structure of a linear vibration motor according to an example according to the present invention (wherein FIG. 2(a) is a plan view wherein the cover plate has been removed, FIG. 2(b) is a cross-sectional view along the section A1-A1 in (a), and FIG. 2(c) is a cross-sectional view along the section A2-A2 in FIG. 2(a)).
Figure 2B:
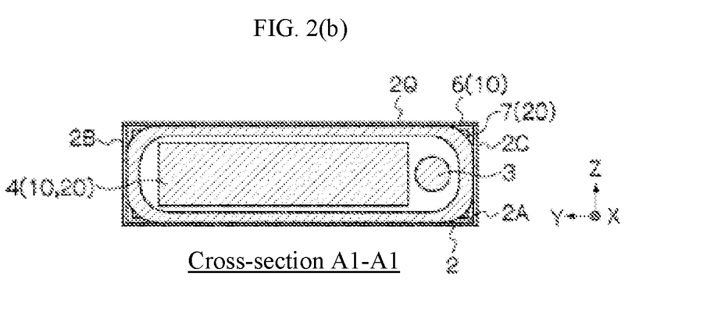
Figure 2C:
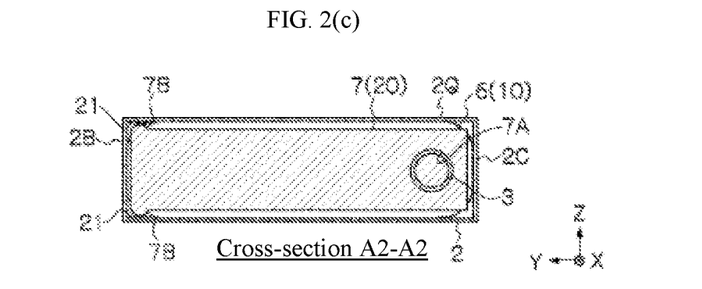
Figure 3A:
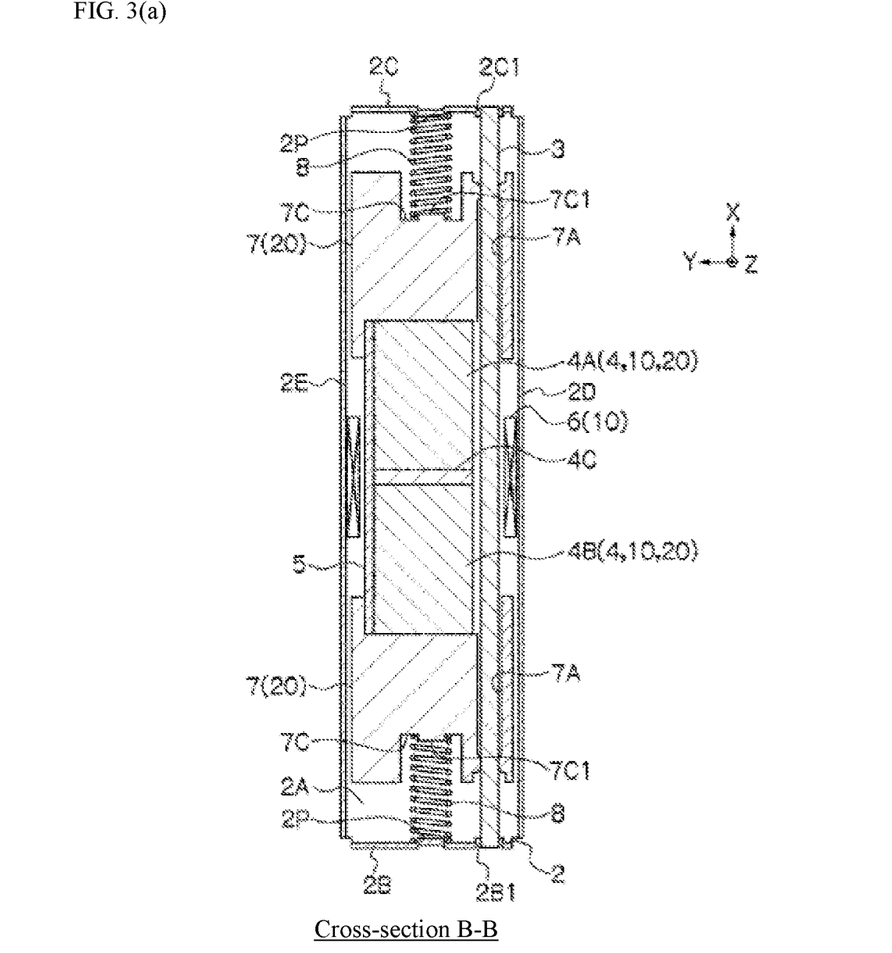
FIG. 3(a) and FIG. 3(b) are explanatory diagrams illustrating the overall structure of a linear vibration motor according to an example according to the present invention (wherein FIG. 3(a) is a cross-sectional view along the section B-B in FIG. 3(a) and FIG. 3(b) is a front view).
Figure 3B:
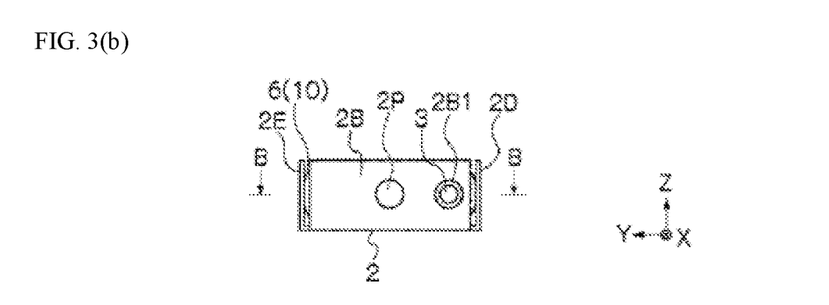

Examples according to the present invention will be explained below in reference to the drawings (where identical reference symbols in different drawings below indicate identical positions, and redundant explanations in the various drawings are omitted). FIG. 1 through FIG. 3 illustrate the overall structure of a linear vibration motor according to one example according to the present invention. The X direction in each of the drawings indicates the direction of vibration (the axial direction), the Y direction indicates the width direction, and the Z direction indicates the thickness (height) direction. The linear vibration motor 1 according to the present example of the present invention is to reduce the thickness in the Z direction.

The linear vibration motor 1 comprises: a frame 2; one stationary shaft 3 that is secured to the frame 2 and that extends in the axial direction (the X direction in the figure); a needle 20 that is supported so as to be able to slide along the axial direction (the X direction in the figure) by the stationary shaft 3; a driving portion 10 for driving the needle 20 in the axial direction (the X direction in the figure); and an elastic member 8.

The frame 2 may have a frame structure that is able to secure a single stationary shaft 3 and able to contain the various components described below, and, in the illustrated example, is provided with side walls 2B, 2C, 2D, and 2E that are provided extending from the edges of a rectangular bottom face 2A, and provided with shaft securing portions 2B1 and 2C1 for securing both ends of a stationary shaft 3 on the mutually opposing side walls 2B and 2C. Moreover, the frame 2, as necessary, is provided with a cover plate 2Q for covering that which is contained within the frame 2. The cover plate 2Q is formed in a rectangular plate shape that is attached to the top end faces of the side walls 2B through 2E. This frame 2 can be formed through machining a metal plate (for example, through performing a pressing process, like).

The stationary shaft 3 is a straight circular column or square column member that has rigidity necessary to produce a stable vibration of the needle 20. Here the stationary shaft 3 is a single unit, so that there will be no need to align axes.

The driving portion 10 is provided with a magnet 4 that structures a portion of the needle 20, and a coil 6 that is secured to the frame 2. The magnet 4 is disposed in parallel to the stationary shaft 3 within the frame 2, where the stationary shaft 3 extends along the axial direction (the X direction in the figure) without passing through the magnet 4.

In the magnet 4, two flat rectangular magnet pieces 4A and 4B that have polarities along the axial direction (the X direction in the figure) are disposed with identical poles facing each other, connected with a spacer yoke 4C interposed therebetween. If necessary, a reinforcing plate 5 is secured to a side face of the magnet 4 to increase the rigidity of the magnet 4 thereby.

In the coil 6, an electric wire is wound along the Y and Z directions around the magnet 4 wherein the direction of the magnetic pole faces the X direction, with the top face and/or bottom face of the coil 6 and, if necessary, a side face thereof as well, secured to the inner surface of the frame 2. Securing of the coil 6 to the frame 2 may be through securing directly to the frame 2, or the coil 6 may be wound onto a coil bobbin with the coil bobbin secured to the frame 2. The magnet 4 is driven in the X direction through the application of an electric current to the coil 6. In the example that is illustrated, the magnet 4 and the stationary shaft 3 are provided on the inside of the coil 6; however, if there is extra space in the Y direction in the figure, the stationary shaft 3 may instead be provided outside of the coil 6.

The needle 20 is provided with the magnet 4 and weight portions 7 that are connected to the magnet 4. In the example that is illustrated, weight portions 7 are connected to both sides of the magnet 4 in the axial direction (the X direction in the figure). Additionally, the needle 20 is supported so as to be able to slide in the axial direction (the X direction in the figure) through the stationary shaft 3 passing through a guide hole 7A that is formed in the weight portions 7. The weight portions 7 may be structured through, for example, a metal material with a high specific gravity, and in the example that is illustrated, are shaped essentially as rectangular solids wherein the height in the Z direction is greater than the thickness of the magnet 4.

Instead of the example that is illustrated, a structure may be used wherein a bearing is connected to the needle 20, and the bearing is supported so as to be able to slide on the stationary shaft 3; however, the efficiency with which the space in the Y direction is used can be increased through the provision of a guide hole 7A directly in the weight portions 7, with the stationary shaft 3 passing through the guide hole 7A, as in the example that is illustrated, enabling a reduction in the width of the linear vibration motor 1. Moreover, providing the guide hole 7A directly in the weight portion 7 makes it is possible to eliminate the bearing, the connecting member for connecting the bearing to the needle 20, and the like, enabling a reduction in the number of components.

Elastic members 8 are disposed off-axis from the stationary shaft 3 within the frame 2, to apply, to the needle 20, an elastic force that opposes the driving force of the driving portion 10. In the example that is illustrated, coil springs that extend and compress along the axial direction (the X direction) are used as the elastic members 8, where the elastic members 8 are disposed coaxially on both sides of the needle 20 in the direction of vibration, where, in this example, two elastic members 8 are disposed between the weight portion 7 and the side walls 2B and 2C.

In the example that is illustrated, the axis of the elastic members 8 is disposed so as to be parallel to the axis of the stationary shaft 3. Additionally, ends of the elastic members 8 engage supporting protrusions 2P that are provided on the side walls 2B and 2C, and the other ends of the elastic members 8 are inserted into attachment recessed portions 7C that are provided in the weight portions 7, and are engaged to supporting protrusions 7C1 within the attachment recessed portions 7C.

The operation of such a linear vibration motor 1 will be explained. When not driven, the needle 20 stands still in the vibration center position wherein the elastic forces of the two elastic members 8 are in equilibrium. When an electric current of a vibration generation signal is inputted into the coil 6, a driving force is applied to the magnet 4 in the X direction, and the needle 20 undergoes reciprocating vibration along the stationary shaft 3 through the driving force and the elastic repulsive force of the elastic member 8. The vibration generation signal preferably is an AC current of a resonant frequency that is determined by the mass of the needle 20 and the coefficient of elasticity of the elastic members 8.

Given such a linear motor 1, the stationary shaft 3 does not pass through the magnet 4, making it possible to secure a magnet volume that is able to produce an adequate driving force through a magnet 4 that is thin in the Z direction and wide in the Y direction, regardless of the diameter of the stationary shaft 3. This enables the production of a thin linear vibration motor 1 able to produce a sufficient driving force. In contrast, in a type wherein the stationary shaft passes through the magnet, as it does in the prior art, the thickness of the magnet must be quite large when compared to the stationary shaft in order to produce an adequate driving force, and is coiled therearound, making it difficult to reduce adequately the thickness when considering the diameter of the stationary shaft and the driving force.

Moreover, in the linear vibration motor 1 according to the example of the present invention, disposing the magnet 4 in parallel to the stationary shaft 3 on one side thereof, makes it possible to secure the magnet volume for producing an adequate driving force without dividing the magnet 4. This makes it possible to produce a linear vibration motor 1 wherein a needle 20 is supported so as to be able to slide on a stationary shaft 3 in a structure wherein there is no increase in the number of components of the magnet 4 and wherein it is possible to prevent a reduction in the volume of the magnet 4.

Furthermore, disposing the elastic members 8 off-axis in relation to the stationary shaft 3 enables a reduction in the diameter of the elastic members 8 regardless of the diameter of the stationary shaft 3. When the diameter of the elastic member 8 is reduced, the elastic force may be set arbitrarily through the selection of the material for the elastic members 8 and through providing many elastic members 8 in parallel. This can also reduce the thickness of a linear vibration motor 1 that is equipped with a stationary shaft 3.

Additionally, in the example that is illustrated, as is shown in FIG. 2 (*a*), the stationary shaft 3 is disposed on either the left or right side relative to the axis O of the needle, along the axial direction of the needle 20 (the X direction in the figure). The space in the Y direction for disposal of the magnet 4 can be increased through the provision of the stationary shaft 3 to the side of the needle 20 in this way. This makes it possible to secure the volume for producing the desired driving force, through increasing the width of the magnet 4 in the Y direction, when the thickness of the magnet 4 in the Z direction is reduced.

At this time, one may consider the needle 20 rotating around the stationary shaft 3 that is disposed shifted to the left or the right side of the needle 20 and the other side, on the left or the right of the needle 20, rotating upward or downward. In contrast, a slide bearing portion 21 with which the needle 20 makes sliding contact is provided on the inner surface of the frame 2 on the other side, the left or the right, and a sliding protrusion 7B for contacting the slide bearing portion 21 is provided on the surface of the weight portion 7 of the needle 20. Given this, when the slide bearing portion 21 is formed from a resin material, or the like, this can preserve stabilized vibration through enabling suppression of the production of noise, or the like, when the other side of the needle 20 contacts the inner surface of the frame 2.

When the position of the magnet 4 that is connected to the weight portion 7 of the needle 20 is shifted upward or downward, the needle 20 can be stuck to either the top or bottom side of the frame 2 through magnetic attraction that acts between the magnet 4 and the frame 2, and thus when such a connecting position for the magnet 4 is used, the slide bearing portion 21 and the sliding protrusion 7B, described above, need be provided on only one side, either the top or the bottom.

Figure 4:
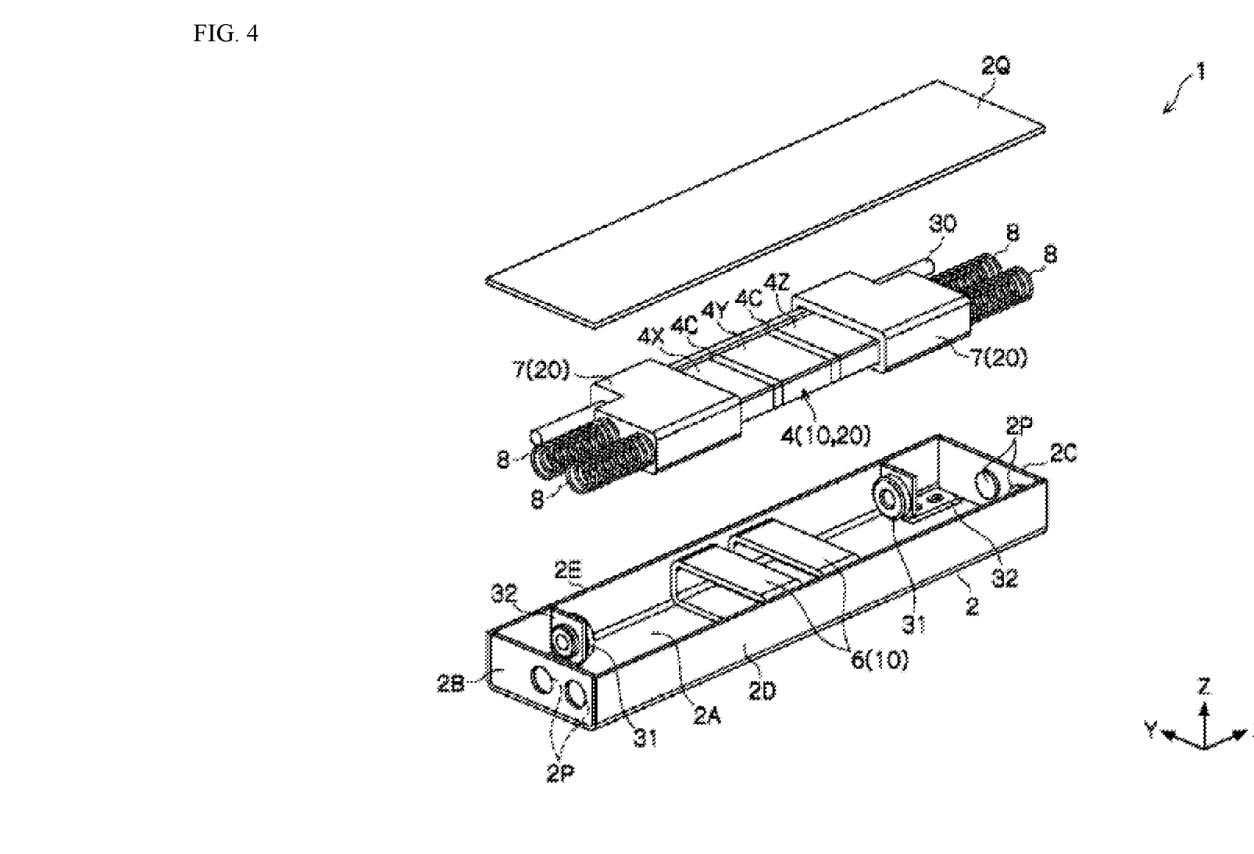
FIG. 4 is an assembly perspective diagram illustrating the overall structure of a linear vibration motor according to another example according to the present invention.
Figure 5:
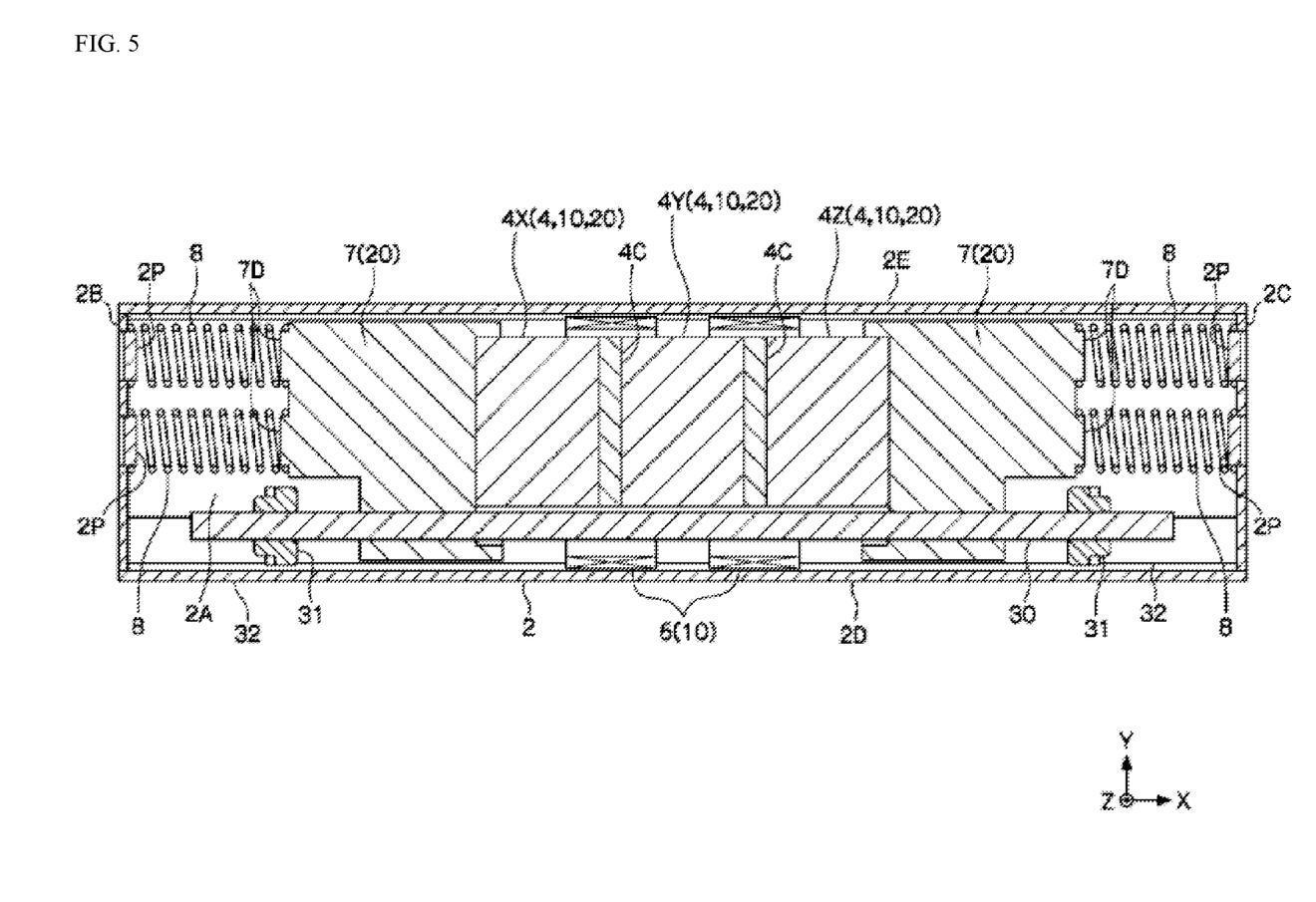
FIG. 5 is a cross-sectional diagram illustrating the overall structure of a linear vibration motor according to another example according to the present invention.

FIG. 4 through FIG. 7 are explanatory diagrams illustrating linear vibration motors according to other examples according to the present invention. Identical reference symbols are assigned to parts that are identical to the example set forth above, and redundant explanations are omitted. The linear vibration motor 1 illustrated in FIG. 4 and FIG. 5 is provided with a movable shaft 30 that is secured to the needle 20 side within the frame 2, instead of the stationary shaft 3 that is described above. The movable shaft 30 is secured to the needle 20, to move along the axial direction together with the needle 20. A bearing 31 for supporting the movable shaft 30 so as to be able to slide is provided in the frame 2. The bearing 31 is attached to a bearing supporting member 32, and secured to the bottom face 2A of the frame 2.

In the example illustrated in FIG. 4 and FIG. 5, the movable shaft 30 is secured to a weight portion 7 of the needle 20. The movable shaft 30 is a single shaft, and is borne on bearings 31 on both end portions thereof. In the example that is illustrated, a magnet 4 that is the driving portion 10 is arranged in parallel to the movable shaft 30 within the frame 2. Here the magnet 4 is structured from three magnet pieces 4X, 4Y, and 4Z, where these are connected with spacer yokes 4C therebetween. The magnet pieces 4X, 4Y, and 4Z are magnetized along the axial direction of the movement shaft 30, where neighboring magnet pieces 4X and 4Y (and 4Y and 4Z) are magnetized in mutually opposing directions. Given this, two coils 6 that form the driving portion 10 are wound in series, and in mutually opposing directions, around the two spacer yokes 4C.

The elastic members 8 that are disposed off-axis from the movable shaft 30 are disposed two on each side of the axis of the movable shaft 30, for a total of four elastic members 8, with the axes thereof parallel to the axis of the movable shaft 30. With this plurality of elastic members 8, one end each (the stationary end of each) is supported on a respective supporting protrusion 2P that is provided on the side wall 2B or 2C of the frame 2, with the other end (the movable end) of each supported on a supporting protrusion 7D that is provided in an end portion of the weight portion 7.

Figure 6:
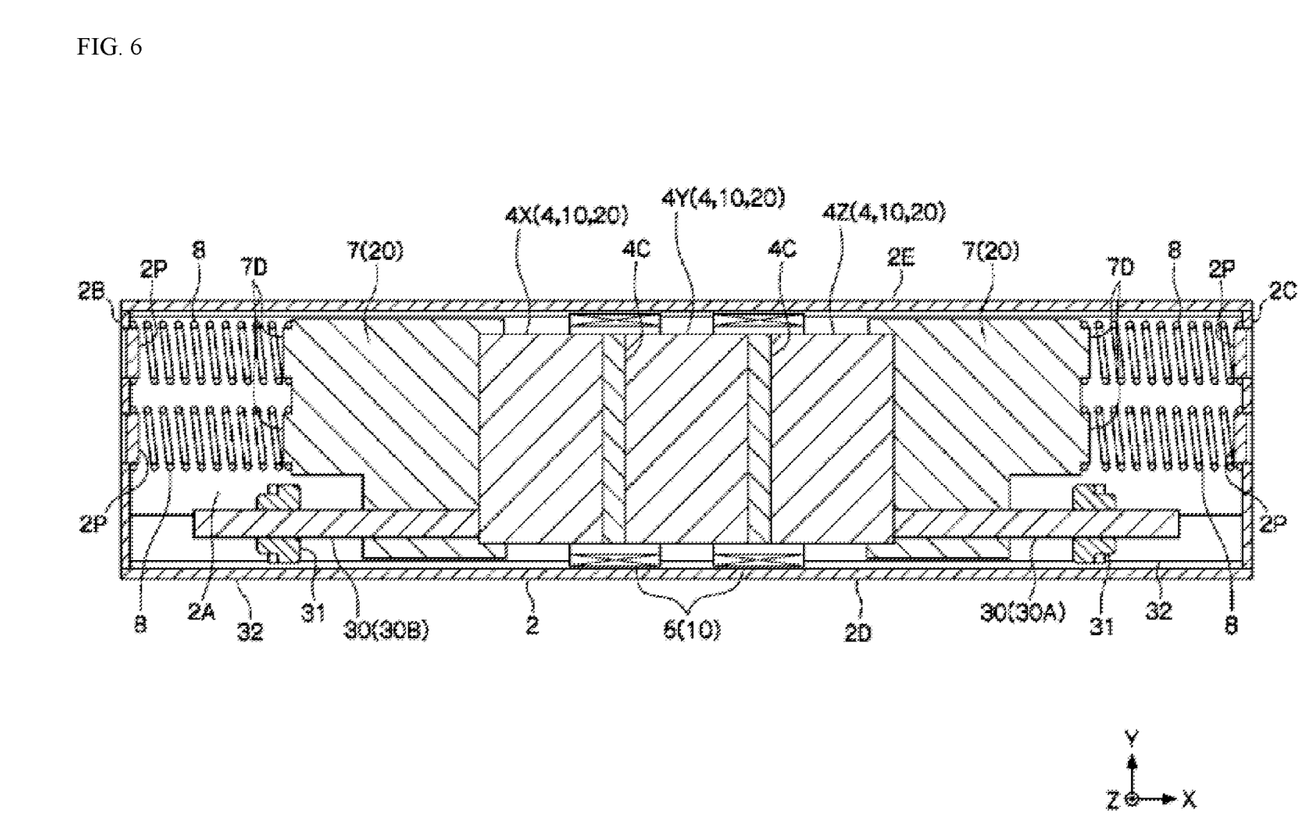
FIG. 6 is a cross-sectional diagram illustrating the overall structure of a linear vibration motor according to another example according to the present invention.

The example illustrated in FIG. 6 is a modified example of the example illustrated in FIG. 4 and FIG. 5, wherein, in the linear vibration motor 1, the movable shaft 30 is divided into two shafts 30A and 30B, disposed along the axial direction. That is, the axes of the shafts 30A and 30B are coaxial. By dividing the movable shaft 30 in this way, and secured one of the shafts 30A to one of the weight portions 7 and securing the other shaft 30B to the other shaft portion 7, the magnet 4 that is provided between the pair of weight portions 7 can be provided so as to be wide in the Y direction that is perpendicular to the movable shaft 30, enabling the driving force to be increased thereby.

Figure 7:
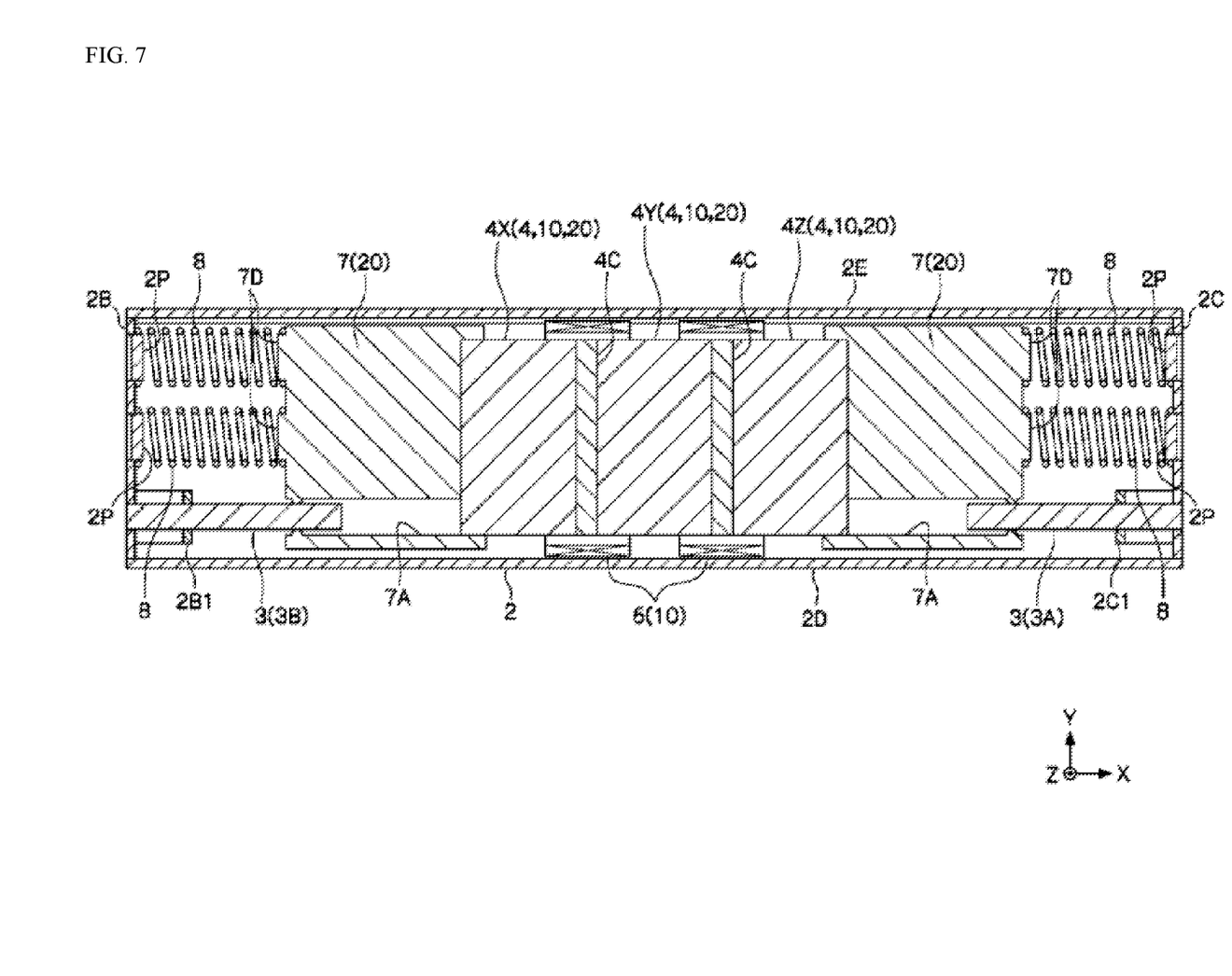
FIG. 7 is a cross-sectional diagram illustrating the overall structure of a linear vibration motor according to another example according to the present invention.

The example illustrated in FIG. 7 is an example wherein the example illustrated in FIG. 6 is further modified, where, in the linear vibration motor 1, shafts 3A and 3B, which are divided along the axial direction, form a stationary shaft 3 that is secured to the frame 2. That is, the axes of the shafts 3A and 3B are coaxial. In these shafts 3A and 3B, one end is supported on a side wall 2B or 2C of the frame 2, and the other end is a free end, where the free end is inserted slidably into a guide hole 7A that is formed in a weight portion 7. The stationary end portions of the shafts 3A and 3B are supported stably by supporting portions 2B1 and 2C1 that are separated in the axial direction from the side walls 2B and 2C of the frame 2.

As explained above, in the linear vibration motor 1 according to the present example of the present invention the needle 20 vibrates along the shaft that is provided protruding from the frame 2 (the stationary shaft 3 or the movable shaft 30), making it possible to produce a stabilized vibration and possible to produce resistance to damage when there is a drop impact, or the like. Given this, the elastic members 8 are provided off-axis from the shaft (the stationary shaft 3 or the movable shaft 30) within the frame 2, thus enabling the diameter of the elastic members 8, which are formed from coil springs, to not be set so as to be larger than the diameter of the shaft, enabling the thickness to be reduced commensurately. This enables the linear vibration motor 1 that is provided with a shaft (a stationary shaft 3 or a movable shaft 30) to be made thinner, while having no increase in the number of components of the magnet 4 and while suppressing a reduction in the volume of the magnet 4.

Figure 8:
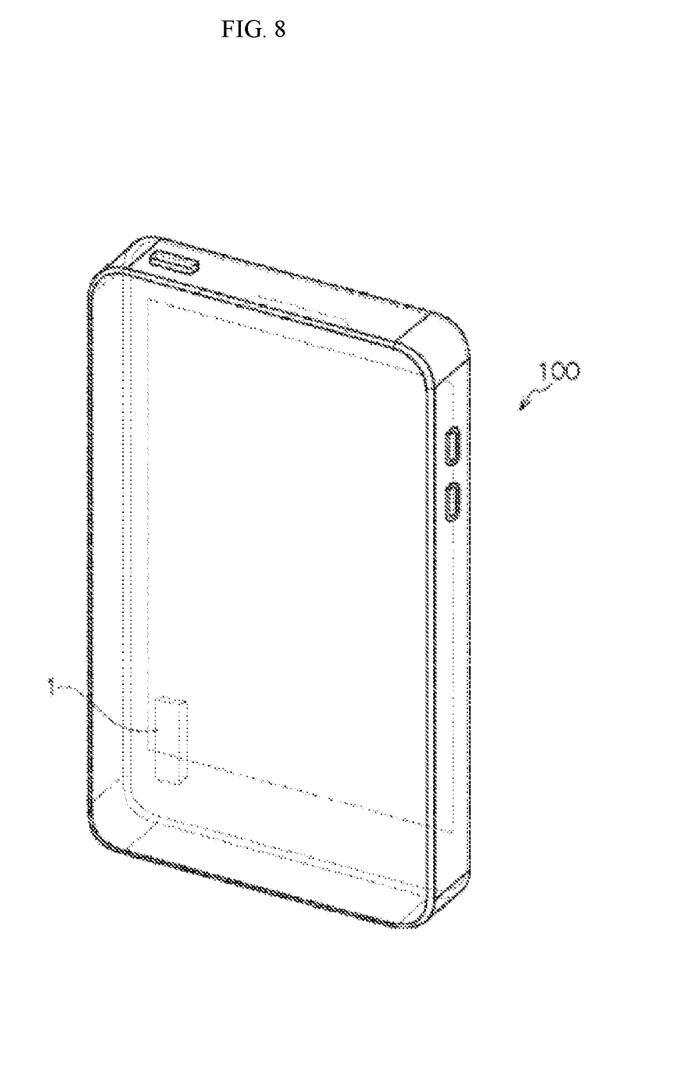
FIG. 8 is an explanatory diagram illustrating the electronic device (a mobile information terminal) equipped with a linear vibration motor according to an example according to the present invention.

FIG. 8 shows a mobile information terminal 100 as an example of an electronic device equipped with a linear vibration motor 1 according to an example according to the present invention. The mobile information terminal 100 that is equipped with the linear vibration motor 1 that can produce a stabilized vibration and for which the thickness can be reduced enables the user to be notified through a stabilized vibration that does not tend to produce noise, when there is an incoming call in a communication function or at the beginning or end of an operation such as an alarm function. Moreover, this makes it possible to produce a mobile information terminal 100 with high mobility and which facilitates design performance, through reducing the thickness of the linear vibration motor 110. Furthermore, because the linear vibration 1 is of a compact shape wherein the various components are contained within a frame 2 of a rectangular shape wherein the thickness is suppressed, it can be mounted, with excellent space efficiency, within a thinner mobile information terminal 100.

While examples according to the present invention were described in detail above, referencing the drawings, the specific structures thereof are not limited to these examples, but rather design variations within a range that does not deviate from the spirit and intent of the present invention are also included in the present invention. Moreover, insofar as there are no particular contradictions or problems in purposes or structures, or the like, the technologies of the various examples described above may be used together in combination.

The invention claimed is:

1. A linear vibration motor comprising:
    a frame;
    a shaft provided protruding along an axial direction within the frame;
    a driving portion, comprising a magnet and a coil secured to the frame, driving the magnet along the axial direction;
    a movable element, comprising the magnet and a weight portion that is connected to the magnet, supported by the shaft so as to be able to slide in the axial direction; and
    an elastic member applying, to the movable element, an elastic force that opposes the driving force of the driving portion, arranged off-axis from the shaft within the frame.

2. The linear vibration motor as set forth in claim 1, wherein the axis of the elastic member is arranged in parallel to the axis of the shaft.

3. The linear vibration motor as set forth in claim 1, further comprising a second elastic member,
    wherein the elastic member is disposed coaxially with the movable element, on a sides in the direction of vibration, and
    wherein the second elastic member is disposed coaxially with the movable element on an opposite side in the direction of vibration.

4. The linear vibration motor as set forth in claim 1, wherein the shaft is disposed at a position that is shifted to the left or to the right relative to the axis of the movable element that extends in the axial direction of the movable element.

5. The linear vibration motor as set forth in claim 4, wherein a slide bearing portion with which the movable element makes sliding contact is provided on an inner surface of the frame on an opposite side, to the left or the right, in relation to the axis of the movable element.

6. The linear vibration motor as set forth in claim 5, wherein a sliding protrusion making contact with the slide bearing portion is provided on a surface of the weight portion in the movable element.

7. The linear vibration motor as set forth in claim 1, wherein the shaft is a stationary shaft that is secured to the frame and provided extending in the axial direction; and
    the magnet is arranged parallel to the stationary shaft.

8. The linear vibration motor as set forth in claim 7, wherein the movable element is supported so as to be able to slide, through the stationary shaft passing through a guide hole that is formed in the weight portion.

9. The linear vibration motor as set forth in claim 7, wherein in the frame, side walls are provided around a rectangular bottom face, and both ends of the stationary shaft are secured to respective mutually opposing side walls.

10. The linear vibration motor as set forth in claim 1, wherein the shaft is a movable shaft that is secured to the movable element and that moves along the axial direction together with the movable element; and a bearing supporting the movable shaft so as to be able to slide is provided on the frame.

11. The linear vibration motor as set forth in claim 10, wherein the movable shaft is secured to the weight portion of the movable element; and the magnet is arranged in parallel to the movable shaft.

12. A mobile information terminal comprising a linear vibration motor as set forth in claim 1.

* * * * *

UNITED STATES PATENT AND TRADEMARK OFFICE
CERTIFICATE OF CORRECTION

PATENT NO. : 10,270,326 B2
APPLICATION NO. : 15/500280
DATED : April 23, 2019
INVENTOR(S) : Yoshinori Katada Page 1 of 1

It is certified that error appears in the above-identified patent and that said Letters Patent is hereby corrected as shown below:

On the Title Page

Item (86) PCT No. should read: PCT/JP2015/071254

Signed and Sealed this
Twenty-third Day of July, 2019

Andrei Iancu
*Director of the United States Patent and Trademark Office*